June 21, 1966  W. S. SWANSON ETAL  3,256,600
TOOL CHANGING MECHANISM
Filed April 23, 1963  4 Sheets-Sheet 1

INVENTORS:
Walter S. Swanson
Carl F. Erikson
BY
Hofgren, Wegner, Allen,
Stellman & McCord Att'ys

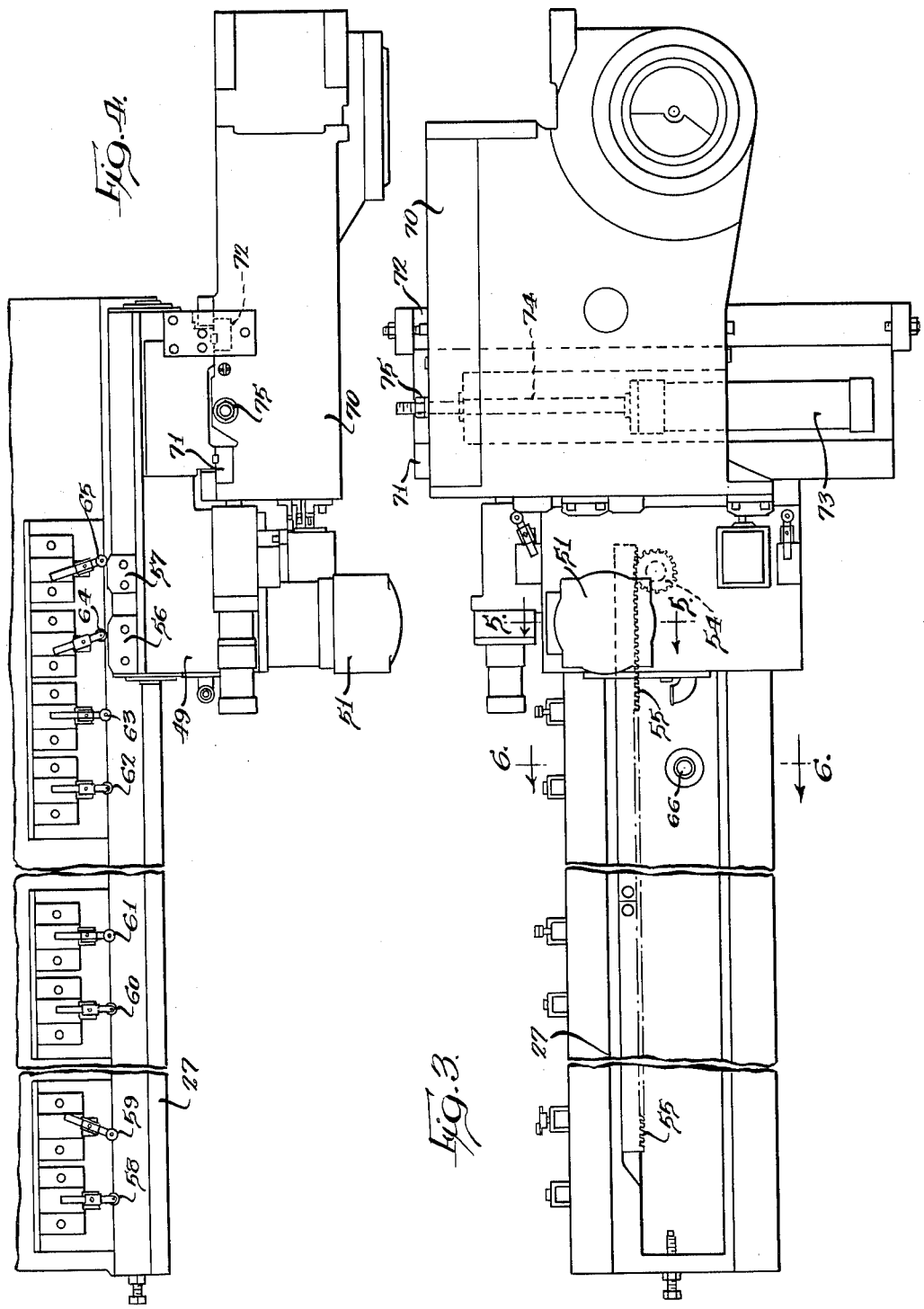

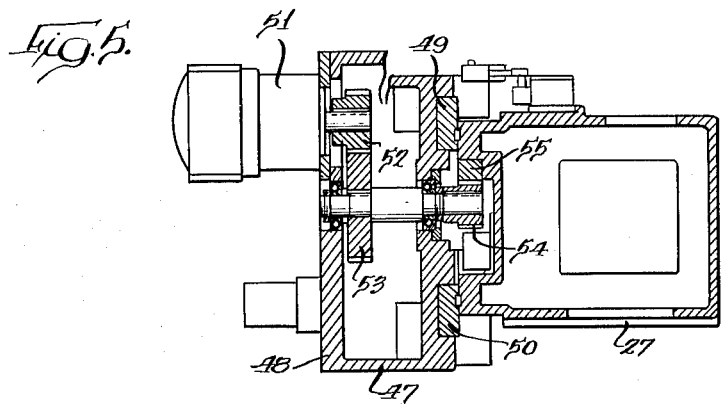
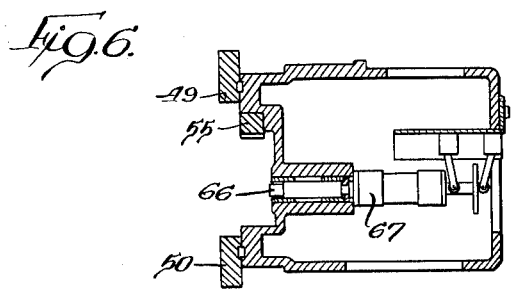
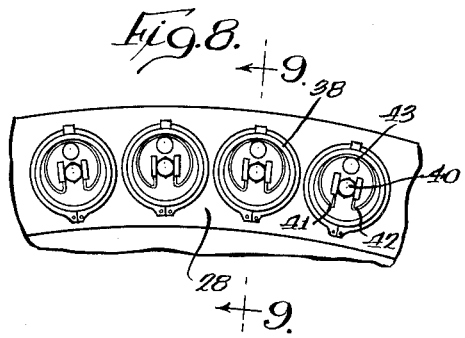
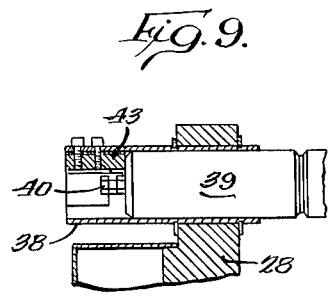

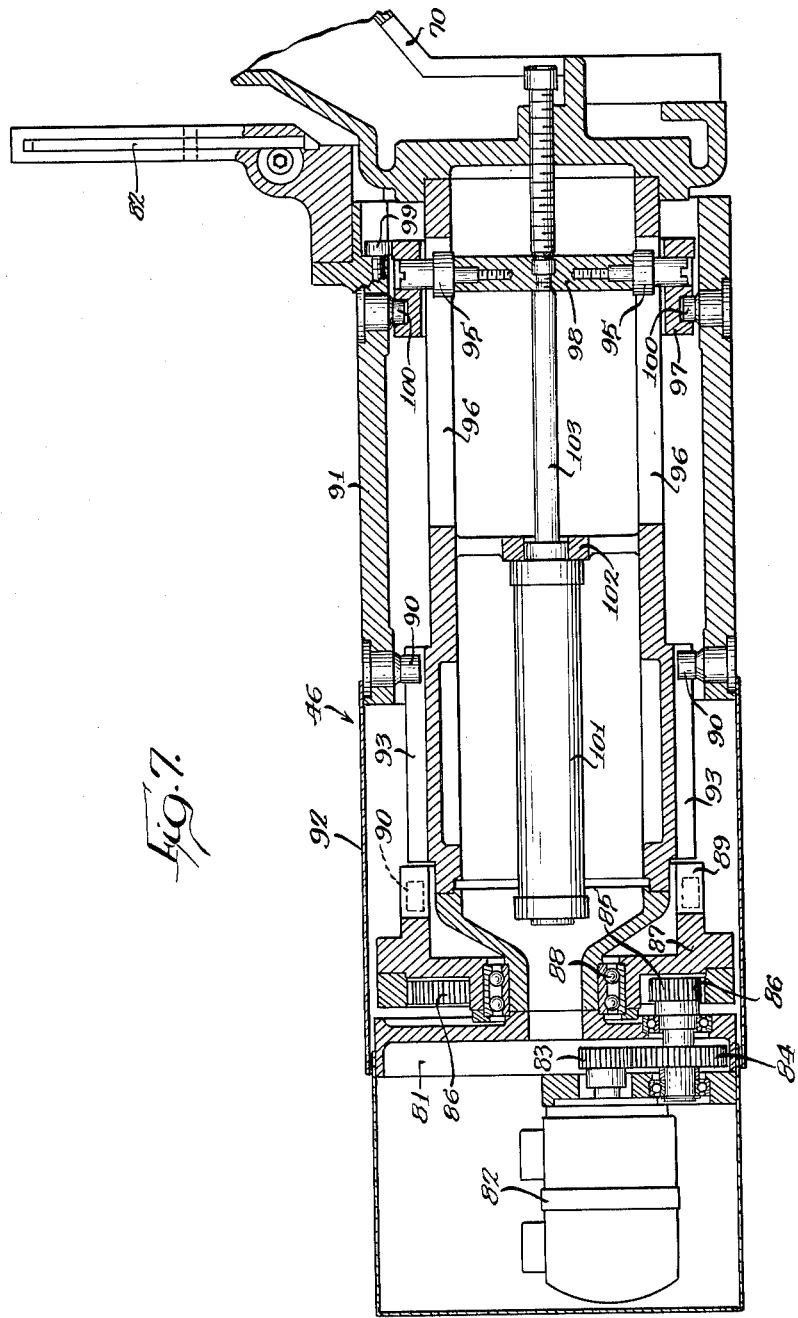

United States Patent Office 3,256,600
Patented June 21, 1966

3,256,600
TOOL CHANGING MECHANISM
Walter S. Swanson, Rockford, and Carl F. Erikson, Belvidere, Ill., assignors to Sundstrand Corporation, a corporation of Illinois
Filed Apr. 23, 1963, Ser. No. 275,038
9 Claims. (Cl. 29—568)

This invention relates to tool changing mechanism and a combination of such mechanism with a machine tool.

In the machine tool field, significant developments have occurred in providing control of the machine tool from numerical control data. This data causes the machine to operate through a complete cycle of machining, including the positioning of various components at different locations along their axes of movement. In rendering the machining operation even more automatic when a variety of tools are required in a machining cycle, tool changing mechanisms have been provided in which a plurality of tools are stored in a drum or matrix and a member simultaneously interchanges tools between the drum and the machine tool spindle. Such mechanisms have limited utilization of a tool storage matrix to its fullest capacity because any pocket in the matrix must be prepared to receive a tool removed from the spindle so that adequate space must be provided in the area of each pocket for receiving the maximum size tool being used. Additionally, the machining area has been reduced by having the tool storage matrix at the machining area.

An object of this invention is to provide a new and improved tool changing mechanism having versatility in size of tools handled and operation.

Another object of the invention is to provide a tool changing mechanism having a tool storage matrix with identifiable pockets associated individually with the particular tool carried in a pocket and with the matrix located at a position remote from a machine tool with tool transfer means for transporting a tool from the remotely located matrix to the machine tool spindle.

A further object of the invention is to provide a machine tool in combination with the tool changing mechanism defined in the preceding paragraph in which the machine tool has a pair of alternately usable spindles which are laterally spaced from each other and in parallel relation with the tool changing means operable to insert and remove a tool from either one of said spindles.

Another object of the invention is to provide tool changing mechanism in which a frame supports an indexable tool storage matrix, means for indexing the matrix to bring a selected tool to a tool transfer position, and means for transporting a tool from the tool transfer position to a machine tool spindle including a guide structure extending therebetween, a carriage movable along the guide structure and a tool transfer arm having a plurality of tool grippers rotatably mounted on the carriage whereby rotation of the arm positions the proper gripper in operative position, said tool transfer arm also having linear movement relative to the carriage for insertion and removal of a tool from the matrix and the machine tool spindle.

Still another object of the invention is to provide a tool changing mechanism as defined in the preceding paragraph in which the tool transfer arm has two pairs of grippers with one pair of a size to grip relatively small tools or tool supporting adapters and the other pair being of a larger size to grip larger diameter tools or tool supporting adapters and a tool cleaning station on said carriage for cleaning a tool prior to insertion thereof into the machine tool spindle.

Further objects and advantages will become apparent from the following detailed description taken in connection with the accompanying drawings in which:

FIG. 3 is a fragmentary elevational view, on an enlarged scale, of a part of the tool changing mechanism shown in FIG. 1 and, particularly, the carriage and guide structure with the mounting of the tool transfer arm removed;

FIG. 4 is a plan view of the structure shown in FIG. 3;

FIG. 5 is a vertical section taken generally along the line 5—5 in FIG. 3;

FIG. 6 is a vertical section taken generally along the line 6—6 in FIG. 3;

FIG. 7 is a vertical section, on an enlarged scale, taken generally along the line 7—7 in FIG. 1;

FIG. 8 is a fragmentary elevational view of a portion of the tool storage matrix; and FIG. 9 is a vertical section taken generally along the line 9—9 in FIG. 8.

Figure 1:
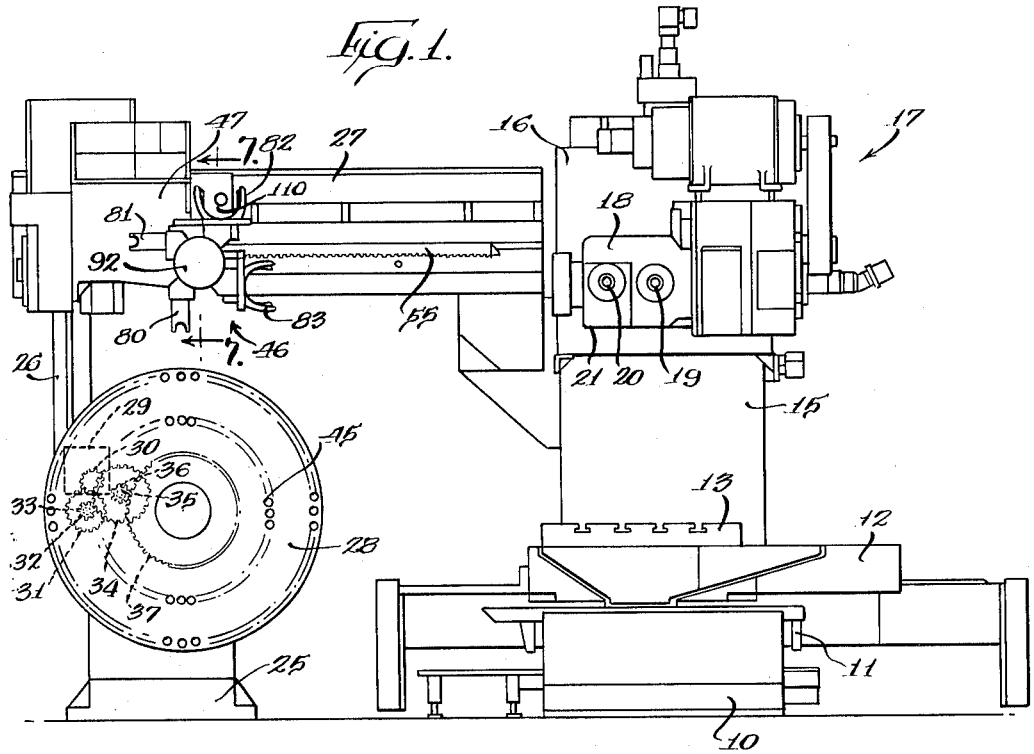
FIG. 1 is a front elevational view of a machine tool and tool changing mechanism associated therewith.

While this invention is susceptible of embodiment in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

Figure 2:
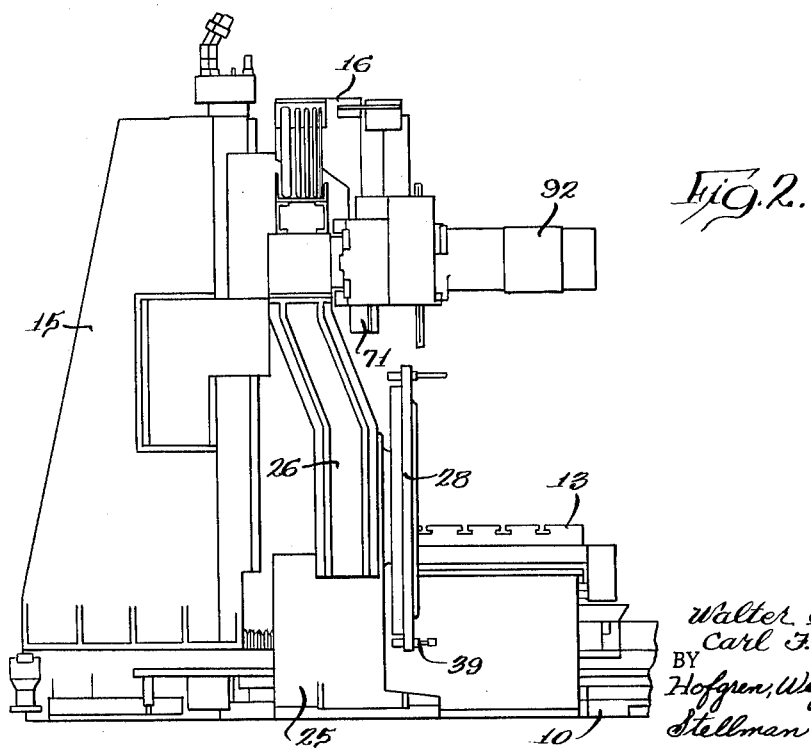
FIG. 2 is an end elevational view looking toward the left-hand end of the machine tool as viewed in FIG. 1.

As shown generally in FIGS. 1 and 2, a machine tool has a bed 10 on which a cross-saddle 11 is movably mounted and which carries a table 12 for movement normal to the path of cross-saddle movement. A rotary table 13 is mounted on the table 12, so that a workpiece supported on the rotary table is movable along two linear axes of movement and also about a third vertical axis of movement. At the rear of the bed 10 a column 15 extends upwardly and supports a slide 16 which is movable up and down relative to the rotary table 13. The slide carries a transmission and drive mechanism indicated generally at 17 and a spindle head 18 having a main spindle 19 and a laterally-spaced parallel high-speed spindle 20 which is mounted on an auxiliary head for providing axial movement of the spindle 20. When the axial head 21 is retracted, it positions the high-speed spindle in side-by-side alignment with the main spindle 19. This construction is shown in more detail in application Serial No. 162,148, filed December 26, 1961.

The machine tool is provided with suitable drive mechanisms which can operate in response to numerical control signals as provided by a data storage medium, such as a tape.

In order to render the operation of the machine tool through a cycle fully automatic, a tool changing mechanism is provided for the machine tool.

This tool changing mechanism provides for insertion of a tool into either of the machine tool spindles 19 or 20 and for cleaning of a tool prior to insertion into a spindle. Additionally, a tool required in the next step of the machining cycle can be selected and prepared for usage in the machine tool while the machine tool is operating with a preceding tool and the tool changer is versatile in handling tools of different sizes in minimum space. Also, the tool can be stored at a remote location to not utilize space in the machining area.

As shown generally in FIGS. 1 and 2, a frame 25 is supported from the floor and has an upstanding support 26 which supports at one end a guide structure 27 which extends from the location of tool storage to a connection with the machine tool column 15.

A plurality of tools are positioned in a storage unit in the form of a tool matrix or drum 28 having a center mounting shaft supported by bearings (not shown) on the frame 25 with the drum being rotatable from a motor 29 which may be hydraulic and supplied with fluid as required for rotation of the tool drum. The motor 29 has a gear 30 on its output shaft which meshes with a gear 31 on an auxiliary shaft 32 and the latter shaft has a gear 33 which meshes with a gear 34 on a shaft 35 supported rotatably on the frame. The shaft 35 has a gear 36 which meshes with a gear 37 on the central mounting shaft of the tool drum.

As shown more particularly in FIGS. 8 and 9, the tool storage drum 28 has a series of sleeves 38, each of a size to receive a body 39 of an adapter which supports a tool, with the tool extending forwardly of the drum or to the right, as shown in FIG. 2. The adapter body has a locating abutment 40 at an end thereof which is positioned within the sleeve and engageable by the ends 41 and 42 of a spring member for retaining the adapter and tool releasably associated with the drum, with the adapter abutting against a stop 43. In this manner, a tool is held releasably in the tool drum 28 for release under the operation of a tool transfer arm subsequently to be described.

Upon suitable rotation of the tool storage drum 28 a tool can be brought to the uppermost position of the drum, which is a tool transfer position, with the selection of the proper tool being determined by code reading mechanism positioned to read keys 45 positioned in holders in the drum to the interior of the sleeves which hold the tools. These keys may be of the type commercially said by Scully-Anthony Company and have surfaces punched in binary code, so that a particular code for a key indicates a particular tool. A key 45 is provided for each tool, so that by means of the reader the tool required can be brought to the tool transfer position of the tool drum 28. Also, the proper empty pocket for a tool as defined by a sleeve 38 can be brought to the tool transfer position when a used tool is to be returned to the drum by reading of the associated key.

A tool is transferred from the tool transfer position of the drum to either of the spindle 19 or spindle 20 by means of a tool transfer arm indicated generally at 46 which is supported on a carriage 47 which is movable along the guide structure 27.

First referring to the carriage 47, the carriage has a casing 48 mounted for movement along ways 49 and 50 of the guide structure 27, as shown in FIG. 5, and has a fluid motor 51 which, through intermediate gears 52 and 53, drives a pinion 54 engageable with a rack 55 secured to the guide structure 27. With this construction, the carriage and tool transfer arm 46 are caused to move linearly from the tool transfer position at the storage drum to a position where a tool is aligned with either spindle 19 or spindle 20. The position of the carriage along the guide structure 27 is determined by the dogs 56 and 57 on the carriage engageable with the switch operating members 58–65, as shown in FIG. 4, with the switches operated by members 58 and 59 controlling the deceleration and stopping of the carriage at the left-hand end of its movement at the tool transfer location, as shown in FIGS. 1 and 4. The switches, operated by arms 60 and 61, provide for deceleration of the carriage as it is moving towards the right when the carriage is to stop in a neutral position intermediate the ends of its travel. The switches, operated by arms 62 and 63, provide for deceleration and stopping of the carriage when a tool is to be placed in the axial spindle 20 and the switches, operated by arms 64 and 65, provide for deceleration and stopping of the carriage when a tool is to be placed in the main spindle 19.

Additionally, positive location of the carriage in placing a tool in the axial spindle 20 is provided by a selectively positionable stop 66, as shown in FIG. 6, which is movable by a cylinder 67. When the stop 66 is retracted, the carriage 47 is free to move to the end of its travel to align the tool transfer arm with the main spindle 19. When the stop 66 is extended, it provides a positive locating position for the carriage when the tool transfer arm 46 is to place a tool in the axial spindle 20.

In addition to the linear movement imparted to the tool transfer arm 46 by the carriage 47, up and down movement is also provided by means of support of the arm 46 on a base 70 which is movable up and down relative to the carriage 47. The base is movable on ways 71 and 72 provided on the carriage 47. Movement of the base 70 along the ways is powered by a vertically positioned hydraulic motor 73 in the form of a cylinder supported on the carriage and having its piston rod 74 connected to the base 70, as indicated at 75.

The tool transfer arm 46, as shown in FIGS. 1, 2 and 7, embodies four grippers 80, 81, 82 and 83, each of which has spring loaded fingers for engaging a handling groove in the body of the adapter and for releasably holding an adapter and the associated tool. One form of adapter that can be handled is shown in application Serial No. 59,236, filed September 29, 1960, issued as Patent No. 3,136,563 and a flanged adapter is shown in application Serial No. 84,576, filed January 24, 1961 issued as Patent No. 3,136,217.

The tool transfer arm 46, as previously described, is mounted for up and down movement relative to the storage drum and for linear movement to and from the machine tool. Additionally, the tool transfer arm 46 has rotation to carry a tool to different rotative positions. The grippers 80 and 81 are provided for handling tool adapters having a relatively small diameter shank, as for example 2 inches, as shown in application Serial No. 59,236, while the grippers 82 and 83 are provided for handling flanged adapters, as shown in application Serial No. 84,576, in which the shank still has the same diameter for insertion in a sleeve in the tool storage drum, but the handling groove is actually provided in a flange of a much greater diameter. With the common shank diameter for the adapters, any adapter whether or not it is flanged can be placed in any holder in the tool storage drum. With each tool eventually returning to its particular holder in the tool storage drum, the tools can be placed as close together as possible in the drum. If a flanged adapter is being used, then spaces are left blank at either side in the drum. This provides for maximum use of space as compared to a system in which a tool returns to a random pocket in the drum wherein the coding for the tool is directly mounted on the adapter for the tool.

As shown particularly in FIG. 7, the base 70 for the tool transfer arm 46 has a tubular sleeve 80 affixed thereto which extends forwardly from the base to engage with a transverse mounting plate 81 for a fluid rotary motor 82 having a driven gear 83 which meshes with a gear 84 rotatably mounted on the mounting plate 81 and which has a gear 85 connected to it.

The selectively driven gear 85 meshes with an internal rack gear 86 on an annular member 87 rotatably mounted on a reduced part of a sleeve 80 by a bearing 88 and which is provided with four circumferentially spaced notches in its periphery for selectively receiving four circumferentially spaced cam rollers. Two of the notches are shown at 89 and two of the cam rollers at 90. The four grippers 80–83 are mounted on an annular member 91 having a cover plate 92 secured thereto. The annular member 91 carries the cam rollers 90 which are each movable along a groove 93 in the outer surface of the sleeve 80. The cam rollers 90 leave their grooves 93 when the grippers are to be rotated and make a drive connection with the motor 82 by moving into the notches 89.

A grooved annular member 97 positioned interiorly of the annular member 91 supports the latter member relative to the sleeve 80. This is accomplished by a four-armed member 98 which is supported in fixed relation to the sleeve while still movable lengthwise of the sleeve. The four-armed member 98 has a roller bearing 95 on each arm. The sleeve 80 has four slots, each receiving one of the roller bearings. With the roller bearings being 90° apart, the four-armed member 98 and the grooved annular member 97 are rigidly supported by the sleeve 80, while being movable lengthwise thereof. The annular member 91 which supports the grippers is mounted for lengthwise movement with the annular member 97 by means of cam rollers 99 and 100 with rollers 100 riding in the groove in member 97, with these cam rollers permitting rotation of the grippers relative to the base 70 and sleeve 80 as caused by motor 82 when the grippers have shifted to the left as viewed in FIG. 7. Further, there must be linear movement of the grippers from right to left as viewed in FIG. 7 for withdrawing a tool from the tool storage drum and a spindle and movement in the opposite direction for inserting a tool in the drum and a spindle. This movement is obtained by a motor in the form of a hydraulic cylinder 101 supported from the sleeve 80 by a frame member 102. The cylinder has a piston rod 103 connected to the four-armed member 98 which carries the grooved annular member 97.

In operation, assuming that a tool is in place in main spindle 19 and it is desired to change a tool, the tool storage drum 28 will be indexed to bring the proper tool to tool transfer position at the top of the drum. The tool transfer arm 46 is then lowered to place one of the grippers of the right size onto the tool and positioned within the handling groove thereof and the tool transfer arm is then moved from right to left as viewed in FIG. 7 by operation of the motor cylinder 101 to withdraw the tool from its holder in the drum. With the gripper still positioned forwardly, the base 70 is elevated relative to the carriage and the gripper is rotated to the cleaning station 110 shown for gripper 82 in FIG. 1. When the gripper has moved to the tool cleaning position, the motor 101 is again operated to shift the gripper rearwardly and the adapter shank is positioned in front of an air blast operated by a switch responsive to the positioning of the adapter at that location for cleaning off the adapter. Tool transfer arm 46 is then shifted along the guide structure 27 to an intermediate neutral position by motor 51 awaiting completion of a machining operation by the tool in the spindle 19. At the completion of a machining operation, the spindle head 18 is rotated and elevated to the position shown in FIG. 1. The tool transfer arm 46 is then advanced to its right-hand limit position to cause the proper size gripper, which is empty, to advance and grip the tool in the spindle. The motor 101 is then again operated to withdraw the tool from the spindle 19 and the tool transfer motor 82 is then operated to rotate the grippers and align the new tool in alignment with the spindle 19. Reverse operation of the motor 101 then seats the new tool in the spindle 19.

The tool transfer arm 46 can then be returned to its position overlying the tool storage drum 28 and the arm is rotated to place the gripper carrying the previously used tool in a downwardly extending position and the tool transfer arm is then lowered with the motor 101 having been operated to shift the tool forwardly. When the tool is in alignment with the proper drum in the pocket in the tool storage drum, by indexing of the drum, the motor 101 is again operated to place the used tool in the drum. The tool transfer arm 46 is then raised and the tool storage drum can be indexed to bring the right tool for the next operation to the tool transfer position.

In the event that a tool is to be supplied to or withdrawn from the axial spindle 20, the switches operated by arms 62 and 63 are rendered operative, as shown in FIG. 4, and also the stop 66 (FIG. 6) is projected to a position to engage the carriage. This stops the tool transfer arm 46 in a position short of its right-hand limit position where the proper gripper will be in alignment with axial spindle 20.

We claim:

1. In combination, a machine tool having a spindle head, a pair of spindles positioned generally side-by-side in parallel relation, a tool storage unit located remote from said spindle head for storing a plurality of tools including a movable matrix, means for rotating said matrix to bring a desired tool to a tool transfer position, and mechanism for transporting tools between said transfer position and either one of said spindles including a guide structure, a tool transfer arm, a carriage movable on said guide structure mounting said arm for movement from the tool transfer position to either one of said spindles, and means on said guide structure engageable with said carriage to locate said carriage in either of two positions with one position locating the carriage and tool transfer arm to coact with one of said spindles and the other position locating the carriage and tool transfer arm to coact with the other of said spindles.

2. In combination, a machine tool having a spindle head, a spindle on said head, a tool storage unit located remote from said spindle head for storing a plurality of tools including a movable matrix, means for rotating said matrix to bring a desired tool to a tool transfer position, and tool changing mechanism for transporting a tool between the transfer position and said spindle comprising, an elongate guide structure extending between the tool transfer position and said spindle head, a carriage movable lengthwise on said guide structure, power means for moving the carriage relative to said guide structure, and a tool transfer arm rotatably mounted on said carriage for movement therewith and rotation relative thereto and having a pair of grippers to simultaneously handle one tool for use in the spindle and another tool previously used in the spindle.

3. A combination as defined in claim 2 in which said tool transfer arm has two pairs of grippers, with one pair of a size to handle simultaneously large diameter tools and the other pair of a size to handle simultaneously small diameter tools.

4. A tool changing mechanism for a machine tool comprising, a frame, an indexable tool storage matrix mounted on said frame, means for rotating said matrix to bring a selected pocket thereof to a tool transfer position, a guide structure extending from said matrix to a location at said machine tool, a tool transfer arm movable along said guide structure for transferring a tool along a path defined by said guide structure, said tool transfer arm having a pair of grippers for handling two tools simultaneously, a carriage movably mounted on said guide structure, a base rotatably mounting said tool transfer arm, means mounting said base on the carriage for movement normal to said carriage movement to carry the tool transfer arm toward and away from the matrix and means for rotating said tool transfer arm relative to the base.

5. A tool changing mechanism as defined in claim 4 in which said carriage has a limit position and an intermediate position on said guide structure for positioning the tool transfer arm at two different positions remote from said tool transfer position.

6. A tool changing mechanism as defined in claim 5 including a stop mounted on said guide structure and projectable into the path of said carriage for positively locating said carriage at said intermediate position.

7. A tool changing mechanism as defined in claim 4 in which said base has a tool cleaning station, and means for rotatably positioning said tool transfer arm to have a tool supported by a gripper positioned at said station.

8. In a tool changing mechanism, a tool transfer arm, a plurality of grippers on said arm, means mounting said tool transfer arm for substantially straight-line movement between a tool storage location and a machine tool, means mounting said tool transfer arm for rotation to place the desired gripper in operative position, and means mounting the tool transfer arm for substantially straight-line movement in a path normal to said first mentioned movement for insertion and removal of a tool from a holder therefor.

9. A tool changing mechanism as defined in claim 8 including a tool storage matrix and means for moving said tool transfer arm along a third substantially straight-line path to move a gripper toward and away from said tool storage matrix.

References Cited by the Examiner

UNITED STATES PATENTS

| | | | |
|---|---|---|---|
| 2,739,717 | 3/1956 | Dinsmore | 29—568 X |
| 2,746,613 | 3/1956 | Meyer | 29—568 X |
| 3,052,011 | 9/1962 | Brainard | 29—568 |

RICHARD H. EANES, JR., *Primary Examiner.*